UNITED STATES PATENT OFFICE.

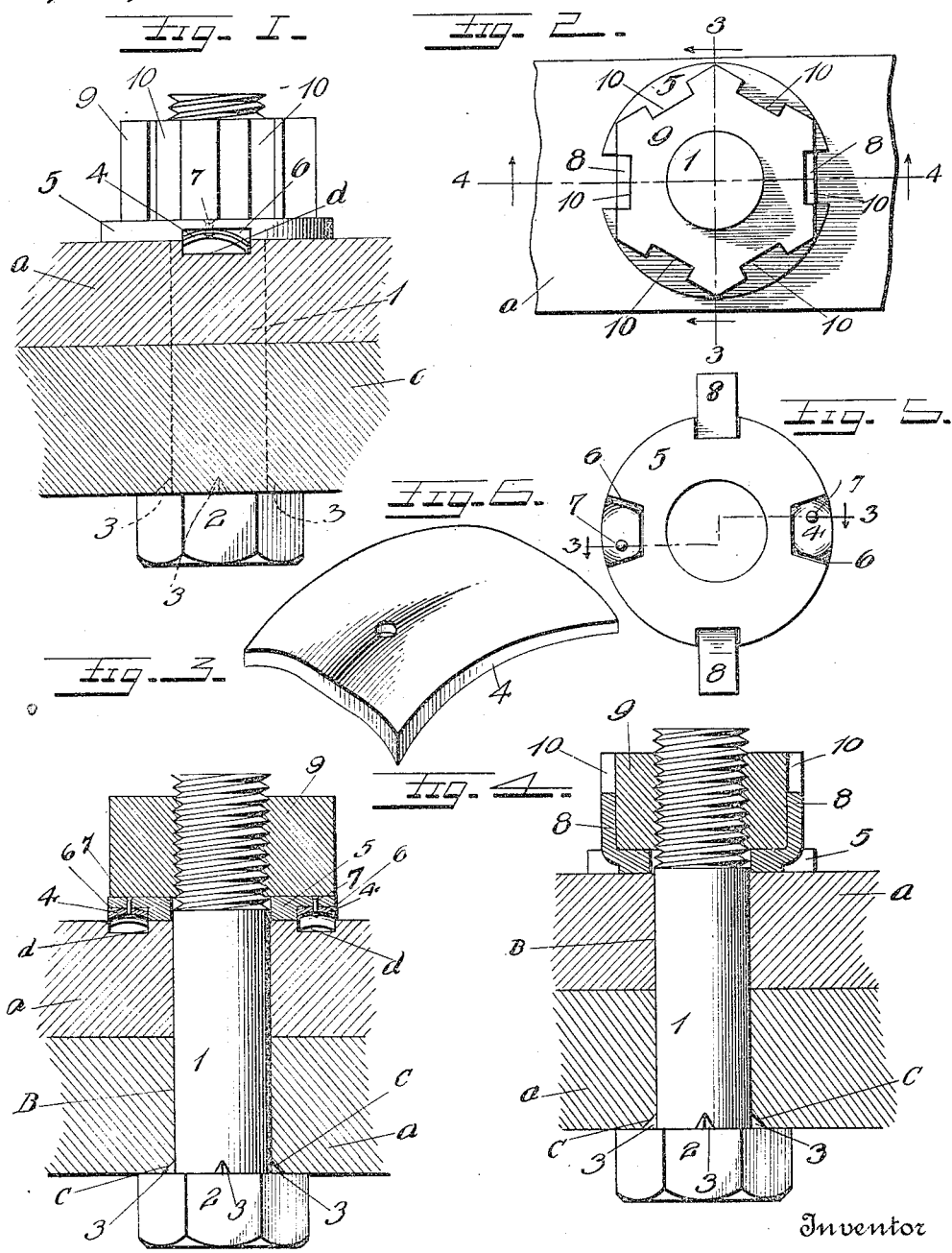

WILLIAM R. HILLER, OF SOUTH BROWNSVILLE, PENNSYLVANIA.

NUT-LOCK.

1,281,369.　　　　　Specification of Letters Patent.　　Patented Oct. 15, 1918.

Application filed July 19, 1917. Serial No. 181,605.

*To all whom it may concern:*

Be it known that I, WILLIAM R. HILLER, a citizen of the United States, residing at South Brownsville, in the county of Fayette and State of Pennsylvania, have invented certain new and useful Improvements in Nut-Locks; and I do declare the following to be a full, clear, and exact description of the invention, such as will enable others skilled in the art to which it appertains to make and use the same.

This invention relates to certain new and useful improvements in nutlocks.

One object of the invention is to provide a means for preventing a nut from turning when applied to a bolt, said means consisting of a washer plate or other suitable member which engages the nut at various portions of the same so that the nut can be locked against movement at practically all positions in its rotary path upon the bolt.

Another object of the invention is to provide an improved means for preventing the washer plate or other similar member from turning.

Another object of the invention is to provide a means which, while securely holding the nut on the bolt under the ordinary tendencies of the nut to become disengaged, may be easily overcome when a wrench is applied for disengaging the nut from the bolt.

A still further object of the invention is to generally improve upon devices of this class by the provision of a comparatively strong, durable and extremely simple construction, one which will be efficient and reliable in operation and well adapted to the purpose for which it is designed.

With these and other objects in view, the invention consists of certain novel features of construction and the combination and arrangement of parts as will be hereinafter fully described and claimed.

In the accompanying drawing forming a part of the application and in which similar reference characters are used to designate corresponding parts throughout the several views:

Figure 1 is a sectional view through a body showing a device constructed in accordance with this invention used in connection with the same. Fig. 2 is a top plan view of the device. Fig. 3 is a sectional view taken on the plane of the line 3—3 of Fig. 2. Fig. 4 is a similar view taken on the plane of line 4—4 of Fig. 2 and Fig. 5 is a bottom plan view of the washer member. Fig. 6 is a perspective view of one of the curved spring members.

Referring more particularly to the drawings, the letters $a$ and $a'$ represent two bodies secured together and each provided with an opening $b$ through which a bolt 1 is extended for securing them. The bolt 1 is similar to the ordinary form of bolts, but differs from the latter in that it is provided adjacent its head 2 with shoulders 3 which fit into recesses $c$ in the body $a'$ at the edge of the opening $b$ to prevent said bolt from turning in said opening.

The body $a$ is provided with recesses $d$ arranged on opposite sides of the opening $b$, and these recesses are each for the purpose of receiving one of the curved spring members 4, which are carried by a washer plate 5. These members 4 are of concavo-convex shape and have four corners which project beyond the body portions of the members to form prongs at the front ends of the spring members to bite into the recesses $d$. Any suitable means may be employed for attaching the members 4 to the washer plate 5 but this is preferably done by recessing the washer plate at opposite points as at 6, and riveting the members 4 to said plate so that they are disposed in the recesses 6 with their corners projecting out of the recesses. The rivets 7 preferably extend through the members 4 adjacent to one side of the latter so that two of the corners of said members project farther outwardly than the other two corners.

The washer plate 5 may be of any suitable configuration but is here shown as being circular and being provided with lugs 8 which project from opposite sides of the plate, and which are adapted to be bent at right angles to the plate when used. In the present embodiment of the invention only two lugs arranged at diametrically opposite points are shown, but it is to be understood that the exact number is immaterial and can be increased or diminished as desired.

The reference numeral 9 designates a nut which is used in connection with this invention. This nut 9 is the same as ordinary nuts with the exception that it is provided with a channel 10 on each one of its sides. These channels 10 are adapted to receive the lugs 8 when the latter are bent upwardly after the nut has been properly adjusted upon the bolt.

In using the device, the bolt is first inserted through the opening $b$ in the two bodies $a$ and $a'$ until its shoulders 3 properly engage the recesses $c$ so as to prevent rotary movement of the bolt. The washer plate 5 is then placed upon the shank of the bolt until the front ends of the concavo-convexed spring members 4 properly engage the recesses $d$ in the body $a$ to prevent turning of the plate. The lugs 8 are disposed in the plane of the plate 5. The nut 9 is then threaded upon the bolt until it reaches its desired adjustment, and one or both of the lugs 8 are bent upwardly into the channels 10. Owing to the fact that the washer plate 5 is provided with more than one lug and the nut 9 is provided with a plurality of sides having channels therein, the nut may be locked at almost any point in its rotary path.

From the foregoing description, taken in connection with the accompanying drawings, it will be seen that the objects of the invention have been effectively carried out, as a very simple, inexpensive and yet comparatively strong, durable, and effective nut-lock has been provided.

As various changes in form, proportion, and in the minor details of construction may be resorted to without departing from the spirit of this invention, it is to be understood that I do not wish to be limited to the construction herein shown and described.

I claim:—

In combination with a body having an aperture therethrough and a recess adjacent to said aperture, a threaded bolt non-rotatably seated in said aperture, a plate apertured to receive said bolt and having tongues normally extending axially parallel with said bolt, said plate also being provided with a recess which normally registers with the first said recess, a nut in threaded engagement with the bolt and formed with a plurality of channels to engage with said tongues, an apertured concavo-convexed spring, and means extending through the aperture of said spring and securing the intermediate part of said spring in the recess of said plate and normally holding an edge portion of the concavo-convexed spring in the recess of said body, substantially as described, for the purpose specified.

In testimony whereof I have hereunto set my hand in the presence of two subscribing witnesses.

WILLIAM R. HILLER.

Witnesses:
 FRED J. CHALFANT,
 CATHERINE LEWIS.

Copies of this patent may be obtained for five cents each, by addressing the "Commissioner of Patents. Washington, D. C."